Patented June 30, 1931

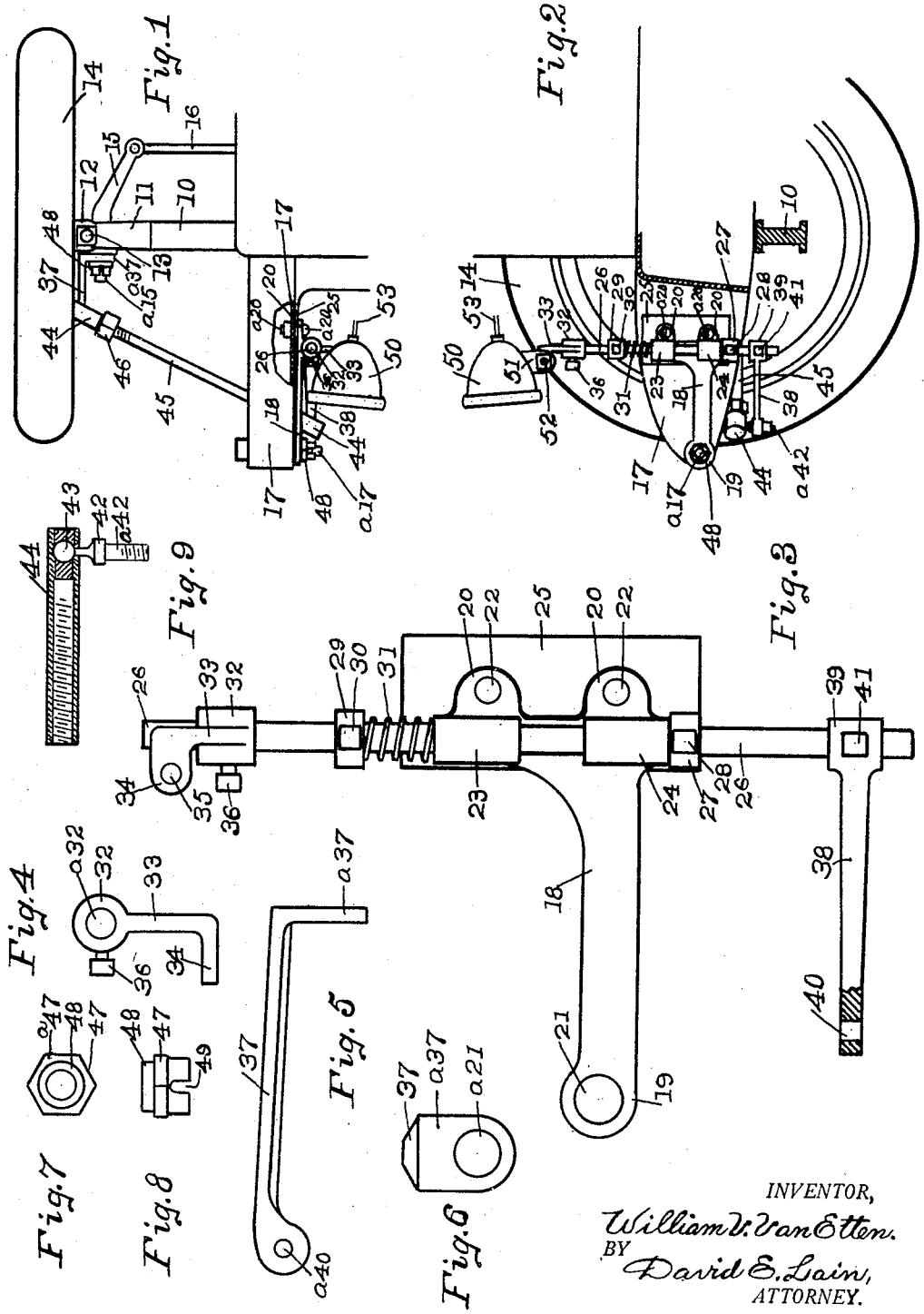

1,812,418

UNITED STATES PATENT OFFICE

WILLIAM V. VAN ETTEN, OF BELLINGHAM, WASHINGTON

DIRIGIBLE GUIDE-LIGHT MOUNTING MECHANISM FOR AUTOMOBILES

Application filed November 29, 1930. Serial No. 499,018.

My invention relates to improvements in dirigible guide-light mounting mechanism for automobiles and is more especially designed for attachment to several different makes and shapes of cars, and has for an object to provide means for securely fastening the mechanism to the car structure mostly by using parts thereof already in place.

Another object of my improvement is to provide full adjustment means whereby the mechanism is adaptable to the varied shapes and dimensions of parts with which it is to cooperate.

Another object of my improvement is to reduce and simplify the parts needed.

Other objects of my improvement will appear as the description proceeds.

I attain these and other objects of my improvement with the mechanism illustrated in the accompanying sheet of drawings, which form a part of this specification, and in which Figure 1 is a plan view of a steering wheel of an automobile and the parts of the mechanism thereof directly connected thereto with my guide-light mounting mechanism in place thereon, Fig. 2 is a side elevation of Fig. 1, Fig. 3 is a side elevation of the oscillatable shaft of my mechanism mounted in the bracket by which it is fastened to the car, Fig. 4 is a plan view of the goose neck bracket by which the lantern of the guide light is mounted on said shaft, Fig. 5 is a plan view of the driving arm of my mechanism for fastening to the steering-wheel knuckle, Fig. 6 is an end elevation of Fig. 5, Fig. 7 is a view of the inner end of a special cylindro-hexagonal nut used in fastening my mechanism to the car, Fig. 8 is an edge view of Fig. 7 and Fig. 9 is a side elevation of the ball and socket joint used on each of my connecting rods shown in section on a vertical plane. Figs. 3–9 are drawn on a larger scale.

Certain parts are broken away for lack of space or to show other parts hidden thereby. Similar characters refer to similar parts throughout.

With particular reference to the designated parts: Front automobile axle 10 has the usual fork at each end thereof one of which is shown at 11, and engaged therewith by knuckle pin 13 is shank 12 of the axle of a steering wheel 14. Also engaged with the axle shank is stud $a15$ extended through a horizontal hole therein and clamped thereto by a nut on the threaded end thereof, said stud shank is the engaging part of steering arm 15 which is pivotally connected to steering rod 16.

The right-hand forward spring of the vehicle has housing 17 thereover on the inner side wall of which shaft-bearing bracket 18 is fastened. Bracket 18 preferably is L shape with stem 18 preferably placed horizontally. Spring hinge bolt $a17$ has its usual clamping nut removed and the stem end of the bracket is engaged therewith by extending said bolt through hole 21 in the end thereof.

Hole 21 is larger than bolt $a17$, large enough in fact, for the cylindrical body 48 of special nut 47, 48, and the bolt is engaged by the nut which is screwed down thereon with cylinder 48 as a bushing in hole 21 and around the bolt and hexagon body 47 providing a shoulder $a47$ and a wrench hold. The nut thus clamps the bracket firmly between the shoulder thereof and the spring housing where the same is engaged by bolt $a17$. The length of cylindrical body 48 is but little less than the thickness of the bracket so that the special nut occupies nearly the same threads on bolt $a17$ as were engaged by the usual nut referred to which was removed.

By this construction of bracket hole and nut the usual bolt $a17$ serves to engage bracket stem 18, and thus is avoided the need of a longer bolt to replace bolt $a17$. Of course, the use of the hexagonal shape of nut is optional as a square or other angular shape of nut would also serve.

On the limb of bracket 19 are two lugs 20, 20 each of which has an opening 22 therethrough. A plate 25 is placed between the limb of the bracket and the side wall of the spring housing and said holes 22 are also made in the plate as continuations of the holes through the bracket. When the bracket and plate are in position on the housing wall holes are drilled therethrough to register with holes 22 and bolts $a20$, $a20$ are extended therethrough and said limb end of the bracket is firmly clamped to the housing wall by nuts placed thereon with the plate intervening. The plate serves to strengthen that part of the spring housing wall to which the fixture is thus clamped by increasing the frictional hold of the fixture on the housing.

There are two vertically disposed upper and lower bearing bosses 23, 24 integral with the bracket limb 18 which have holes therethrough in line to amount shaft 26 for oscillation therein and also for reciprocation in adjustment. Set ring 27 is mounted on shaft 26 beneath bearing boss 24 and has set screw 28 therein to bear on the shaft to retain the ring in desired locations thereon and limit the upward movement of the shaft as desired.

Set ring 29 with set screw 30 therein is mounted on shaft 26 above upper bearing boss 23 with spiral spring 31 intervening. Set ring 29 is retained by set screw 30 at a location to cause sufficient reaction from the spring between the set ring and boss 23 to retain set ring 27 as a shoulder to the shaft against boss 24 and support whatever load the shaft may be required to bear. The resilience of spring 31 also serves to prevent rattling noises between the shaft and its bearings and further serves to preserve electrical contact between them that they may provide an electrical conductor for the lamp circuit as hereinafter mentioned.

A goose-neck bracket consisting of lug 32, which has an opening through which shaft 26 is extended, neck 33 and ear 34, is secured on the shaft, by set screw 36 engaged in a threaded hole in the lug, near the upper end thereof and is adjustable thereon both radially and longitudinally.

Drive arm 37 has foot part $a37$ with opening $a21$ therethrough and hole $a40$ in the other end thereof. Hole $a21$ is large enough to receive the cylindrical shank of nut 47, 48 and said foot part $a37$ is seated on the front of axle shank 12 with stud $a15$ extended through hole $a21$ when said nut is engaged with the threaded end of the stud and screwed down thereon to cause the shoulder thereof to bear on the foot part and clamp drive arm 37 firmly to the axle shank with cylindrical part 48 of the nut serving as a bushing between the stud and the foot part. As above described, this construction of nut and foot allows the nut to engage with the same threads on stud $a15$ as did the nut which was removed therefrom and, since the thickness of the foot $a37$ is somewhat greater than the length of the cylindrical part of the nut, the nut can not bear on the axle shank to prevent the bearing of the foot thereon. This construction allows the use of arm 15 and stud $a15$ thereon and yet provides secure fastening for my drive arm to the axle shank without requiring structural changes therein.

Arm 38 has lug 39 integral therewith and is provided with an opening through which the lower end of shaft 26 is extended, and it is retained in desired locations in both radial and reciprocal adjustments on the shaft by set screw 41. Hole 40 in the outer end of arm 38 is parallel with the hole in lug 39 and is suited for the extension of stud $a42$ on ball 43 therethrough; also hole $a40$ in drive arm 37 is parallel with the hole 40 and suited to receive one of the ball studs. Shank 42 of ball 43 is larger than stud $a42$ and provides a shoulder to bear on the upper side of said arms when the studs are extended through holes 40 and $a40$ and clamped by nuts engaged on the protruding threaded ends of the studs beneath said arms. One end of socket sleeve 44 is adapted to engage ball 43 and the other end thereof is a threaded sleeve to engage a threaded end of connecting rod 45.

Set nuts 46 are placed on the threaded ends of the connecting rod before sleeves 44 are engaged therewith. The sleeves are set on the connecting rod to cause balls 43 to retain arms 37 and 38 in desired relation, which is usually paralled as shown in Fig. 1.

Nuts 47, 48 are provided with pairs of slots 49 and when set in place on their bolts a hole is drilled in each bolt end registering with one of slots 49 and a cotter pin is extended therethrough in the usual manner.

Lantern 50, housing an incandescent electric lamp, not shown, has ear 51 projecting from its bottom wall with a hole therethrough. By means of bolt 52 this ear is clamped to ear 34 on the goose neck bracket after the axis of the lantern is set in the desired position. This axis location is adjustable by use of the set screw in the gooseneck bracket and also by clamping bolt 52.

The electrical conduits for the lamp socket, not shown, in lantern 50 are shown at 53. One of these connects with one terminal of the car's battery, not shown, and the other is connected to the most convenient clamping means on the frame work. As stated, spring 31 insures electrical contacts between shaft 26 and its bearings.

From the above description it should appear that bracket 18 is adapted for easy and secure attachment to the chassis, that shaft 26 is readily adjustable both radially and longitudinally, that the axis of lantern 50 is adjustable in elevation and also in both horizontal and vertical planes, and that but few parts and those of a simple character are required in my mechanism for mounting the lantern on the automobile chassis and connecting it to the steering gear to cause it to maintain close parallelism with the planes of the steering wheels.

Having thus disclosed my invention, what I claim as new therein and desire to secure by Letters Patent is,—

In a mounting mechanism for automobile dirigible guide lights a vertical-shaft bearing bracket flange having an opening therein for extending therethrough the front spring hinge bolt of said automobile said opening larger than said spring hinge bolt also having other openings therein for extending therethrough bolts engaged with the housing wall of the spring, and a cylindro-angular nut on said spring hinge bolt bearing on said bracket flange with the cylindrical portion thereof extended in the larger opening around the spring hinge bolt as a bushing thereto.

WILLIAM V. VAN ETTEN.